United States Patent [19]

Desjourdy

[11] Patent Number: 4,969,085

[45] Date of Patent: Nov. 6, 1990

[54] MEMORY MODULE FOR A MEMORY-MANAGED COMPUTER SYSTEM

[75] Inventor: Russell R. Desjourdy, Chino, Calif.

[73] Assignee: Intellignet Computer Engineering, Hopedale, Mass.

[21] Appl. No.: 227,814

[22] Filed: Aug. 3, 1988

[51] Int. Cl.[5] .......................... G06F 12/08; G06F 13/00

[52] U.S. Cl. .................................... 364/200; 364/900; 364/238.4; 364/244; 364/926.92; 364/965

[58] Field of Search .............. 365/230, 230.01, 230.03; 364/200 MS File, 900 MS File

[56] References Cited

U.S. PATENT DOCUMENTS

| | | | |
|---|---|---|---|
| 4,037,215 | 7/1977 | Birney et al. | 364/200 |
| 4,050,094 | 9/1977 | Bourke | 364/200 |
| 4,145,733 | 3/1979 | Misunas et al. | 364/200 |
| 4,757,466 | 7/1988 | Miyaoka et al. | 364/200 |

*Primary Examiner*—Allen MacDonald
*Assistant Examiner*—Gopal C. Ray
*Attorney, Agent, or Firm*—Joseph S. Iandiorio

[57] ABSTRACT

A memory module for controlling access by a processor to information stored within the memory module including a memory for storing a plurality of groups of information, each group including a data word, an operation word for indicating the operation to be performed by the processor on the data word, and a state word for representing the status of that group for processing by the processor. A selection module accepts an access request from the processor for an identified group, and for interpreting the contents of the request. The memory module further includes a state modification module for determining, based on the information within the identified group in the memory and the interpretation by the selection module, when the identified group is ready to be processed by the processor, for updating the status of the identified group by selectively modifying the state word, and for selectively signalling the processor when the identified group is ready to be processed.

14 Claims, 9 Drawing Sheets

100
PROCESSOR QUEUE
110
VECTOR LATCH
162
VECTOR ADDER
160
MATH UNIT
155
DATA LATCH
154
106
Address
109
Queued Status
124
Control
157
Status
Address
Data
114
108
PACKET ROUTING MODULE
126
122
158
Processor Packet
Vector Packets
118
138
142
144
Acknowlege
Selected Cell Information
128
130
136
140
LOCAL MEMORY
111
REMOTE MEMORY
132
REMOTE MEMORY
134
To/From FIG. 3b
A
B
C
D
E
F
G
H
I
J

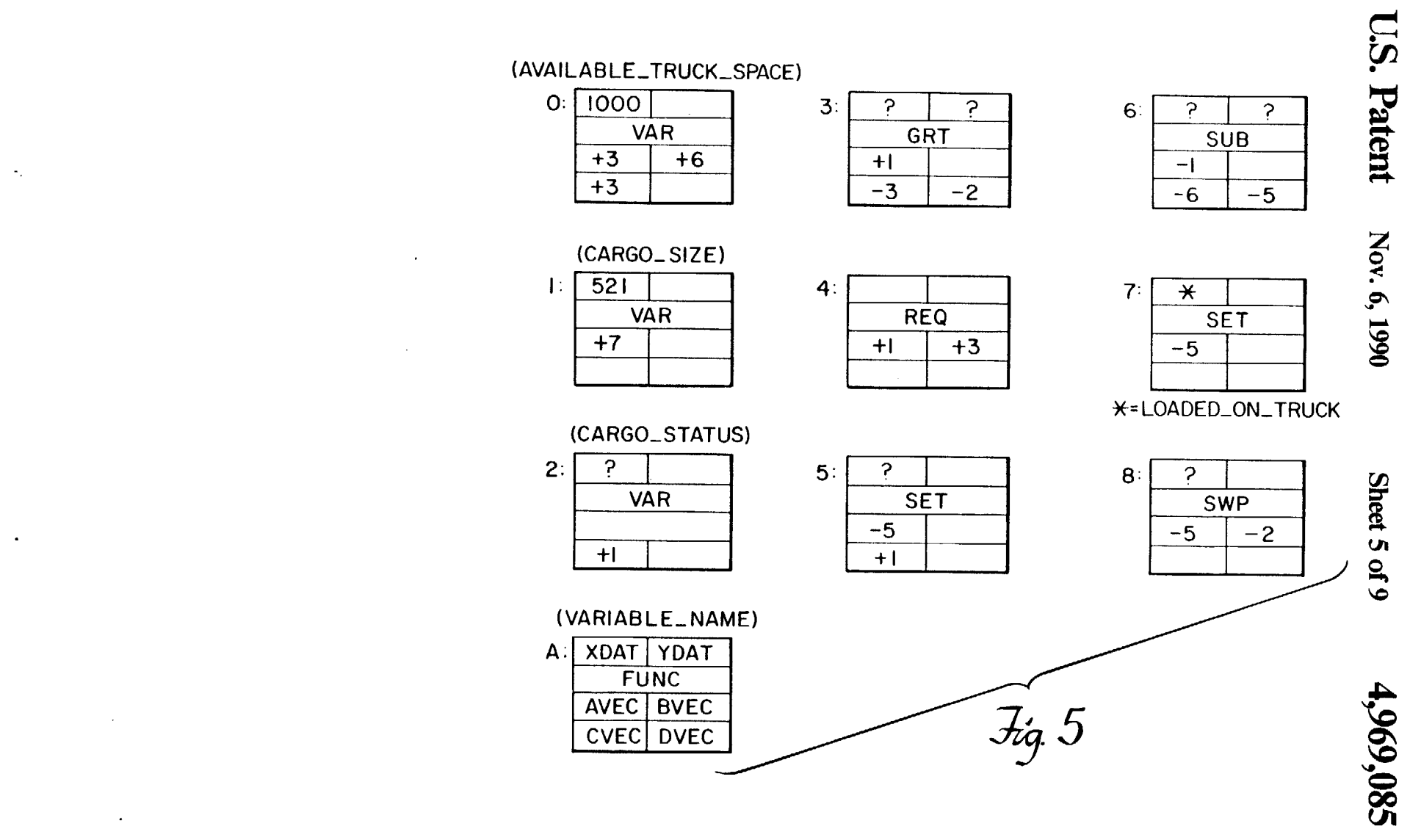

0: (AVAILABLE_TRUCK_SPACE) 1000 VAR +3 +6 +3

1: (CARGO_SIZE) 521 VAR +7

2: (CARGO_STATUS) ? VAR +1

A: (VARIABLE_NAME) XDAT YDAT FUNC AVEC BVEC CVEC DVEC

3: ? ? GRT +1 -3 -2

4: REQ +1 +3

5: ? SET -5 +1

6: ? ? SUB -1 -6 -5

7: * SET -5

*=LOADED_ON_TRUCK

8: ? SWP -5 -2

Fig. 5

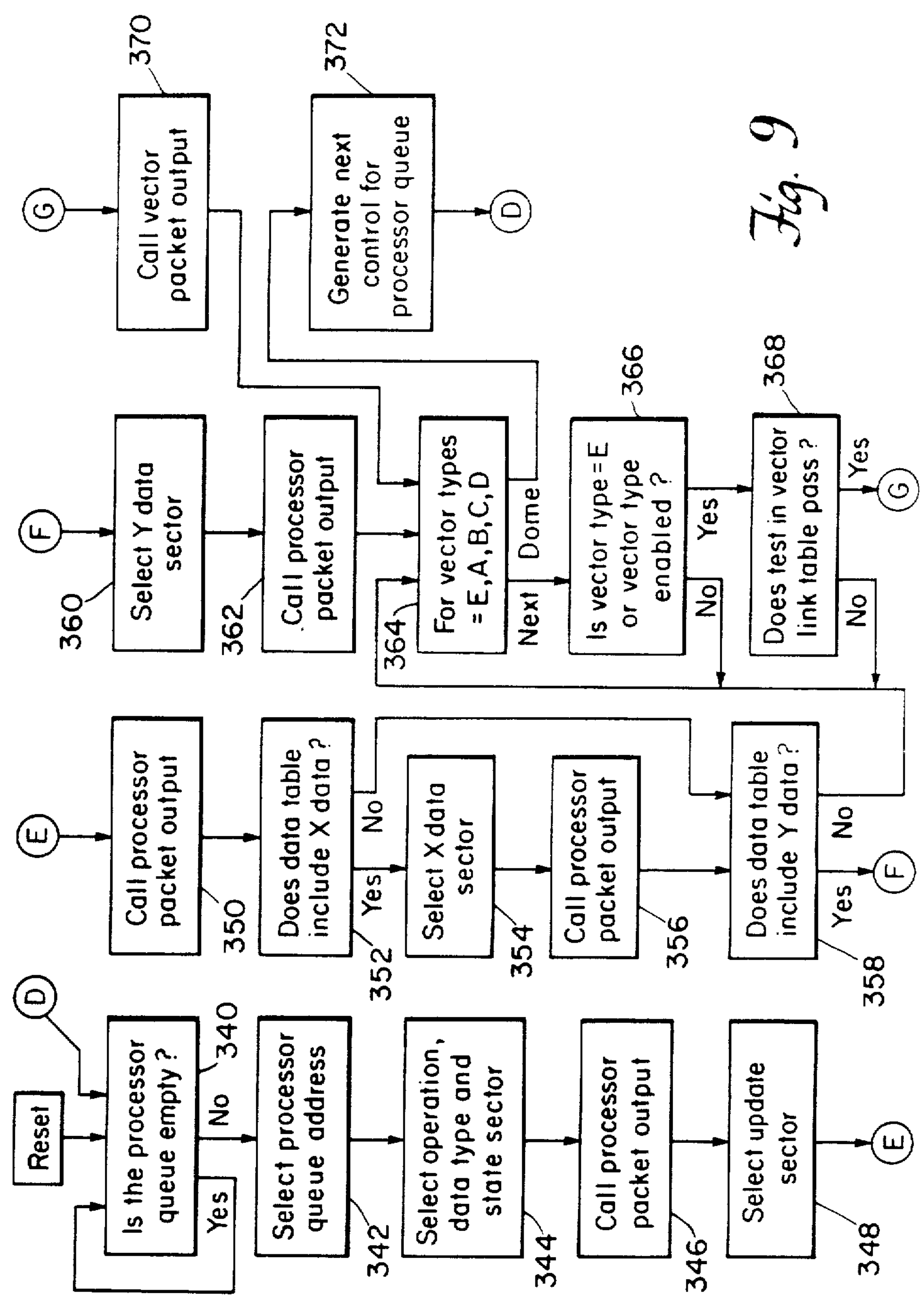
Reset
Is the processor queue empty?
Yes
No
340
D
Select processor queue address
342
Select operation, data type and state sector
344
Call processor packet output
346
Select update sector
348
E
Call processor packet output
350
Does data table include X data?
352
Select X data sector
354
Call processor packet output
356
Does data table include Y data?
358
F
Select Y data sector
360
Call processor packet output
362
For vector types =E,A,B,C,D
364
Next
Dome
Is vector type=E or vector type enabled?
366
Does test in vector link table pass?
368
G
Call vector packet output
370
Generate next control for processor queue
372
Fig. 9

MEMORY MODULE FOR A MEMORY-MANAGED COMPUTER SYSTEM

FIELD OF INVENTION

This invention relates to memory for a computer system and more particularly to memory which controls access by a processor to information stored within the memory.

BACKGROUND OF INVENTION

A computer system generally consists of a processor and a memory. During a processing operation, the processor has the responsibility of locating and managing information in memory that is necessary for solving the problem at hand. In other words, memory operates as a slave to the processor and only supplies information to the processor when requested. A problem with this construction is that the processor is not free to process other information while locating or managing the information in memory to be processed.

For larger scale problems requiring high computational demands, parallel processing systems which include multiple processors have been developed for simultaneously solving various aspects of a problem. These systems typically include an array of processors linked to a common memory. Such parallel processing systems are well suited for solving problems involving matrix operations; however, difficulties arise in non-matrix problems because each processor must be programmed so that they are coordinated to timely access stored information to solve various aspects of the problem at hand. Problem solving for non-matrix type problems may often result in a memory bottleneck.

As an example, high-speed execution by parallel processing systems as applied to rule based systems is quite limited. The limited speed of execution is typically due to the large number of rules in such systems, the small number of rules relevant to each change in the data base, the large variation in the processing requirements of relevant rules, and the small number of changes made to the data base between synchronization steps.

SUMMARY OF INVENTION

It is therefore an object of this invention to provide a memory module that informs a processor when information located in memory is ready to be processed by the processor.

It is a further object of this invention to provide a memory module that manages the state of each of a plurality of groups of information for processing.

It is a further object of this invention to provide such a memory module which selectively controls the order of groups ready to be processed by the processor.

It is a further object of this invention to provide such a memory module in which the groups are linked according to rules relevant to the problem to be solved for establishing a network of groups to be processed.

Yet another object of this invention is to provide groups of information that are self-supporting in that each group contains data, an operation to be performed on those data, and a linking operation for placing the results of the operation in another group or for locating data in another group that is necessary for completing the operation to be performed.

A still further object of this invention is to provide an independent memory module that eliminates the responsibility of a processor to synchronously locate information to be processed.

This invention results from the realization that a truly effective high-speed execution computer system for a rule-based system can be achieved by an independent memory module which manages a plurality of groups of information stored in memory by selecting an access request from a processor identifying a group to be processed, determining when the identified group is ready to be processed by examining selected information within the identified group and the interpretation of the access request, and selectively signalling the processor when the identified group is ready to be processed by the processor.

This invention features a memory module for controlling access by a processor to information stored within the memory module. The memory module includes a memory means for storing a plurality of groups of information, each group including a data word, an operation word for indicating the operation to be performed by the processor on the data word, and a state word for representing the status of that group for processing by the processor. The memory module also includes selection means for accepting an access request from the processor for an identified group, and for interpreting the contents of that request, and a state modification means for determining, based on the information within the identified group in the memory means and the interpretation by the selection means, when the identified group is ready to be processed by the processor, for updating the status of the identified group by selectively modifying the state word, and for selectively signalling the processor when the identified group is ready to be processed.

In one embodiment, the selection means selectively writes at least a portion of the contents of the access request into the identified group in the memory means. Each of the groups includes at least one vector word for linking that group to at least one other group. The access request includes an address for the identified group and the memory module may further include means for combining the vector word with the address of the identified group for linking the processor to other groups. Each group may be organized into sectors having unique addresses including a data sector for storing the data word, a function sector for storing the operation word and the state word, and at least one vector sector for storing each vector word.

The access request accepted by the selection means may be a vector packet or a processor packet. The vector packet may include an address for the identified group, a sector address for that group, a data word, and a data type word indicating the associated classification of the data word. The selection means may also include means for writing the data from the vector packet into the data sector and the data type into the function sector. The processor packet may include an address for the identified group and a sector address for that group for accessing information from an identified group.

This invention also features a memory module for controlling access by a processor to information stored within the memory module which includes a selection means for accepting a memory access packet from the processor and a cell packet memory. Selection means further include means for interpreting the content of the memory access packet and generating control signals based on the interpretated contents, the memory access packet having at least a cell packet address and a sector address. The cell packet memory stores a plurality of cell packets in associated cell packet records, each cell packet record including at least one data sector for storing data, at least one vector sector for linking together other cell packet records to be processed, and a function sector which includes an operation word for identifying predetermined function to be performed by the processor and a state word for indicating the state of the cell packet for processing by the processor. The memory module further includes means, enabled by a control signal of selection means, for writing data from the memory access packet into the sector of the cell packet identified by the sector address. The memory module also includes a state modification means for updating and maintaining the state of the cell packet for processing and means, enabled by a control signal of the selection means, for reading out information in the identified sector by the memory access packet to the state modification means. The state modification means generates a state value based on the information in the identified sector, and produces, based on the generated state value, a status signal to the processor indicating that the cell packet is ready for processing. Means are included for writing the generated state value into the function sector of the identified cell packet to update the function sector. Means, enabled by a control signal of the selection means, is also included for reading out information identified by the cell packet address and sector address processor.

The memory access packet may be a vector packet or a processor packet. The vector packet includes a cell packet address, the cell sector address, data value, and a data type. The means for writing may further include means for writing the data type from the vector packet into the sector of the cell packet identified by the sector address. The processor packet includes a cell packet address and a cell sector address for accessing information. The memory module controls access by a plurality of processors and the selection means select one memory access packet from a plurality of memory access packets. Means may be included for supplying the processor with the vector word identified by the sector address and the address of the identified cell packet for linking the processor to the next cell packet to be processed.

This invention further features a memory module for memory managed computer system for successively processing a plurality of vector packets and processor packets supplied from at least a local processor includes connection means for supplying a vector packet or a processor packet from the local processor and means responsive to the connection mean for identifying the type of packet and for acknowledging receipt of the supplied packet to the local processor. Each vector packet includes a cell packet address, a cell sector address, data value, and a data type. Each processor packet includes a cell packet address and a cell sector address. The system further includes memory means configured in a plurality of cell packet records, each cell packet record arranged in a plurality of sectors including a function sector which includes an operation field for storing an operation word that is used by the processor to perform a preselected function, a state sector for storing a state word to indicate the state of the cell packet for processing by the processor, at least one vector sector for storing a vector word used to link together other cell packets to be processed by the processor, and at least one data sector for storing data words. The memory module further includes a vector packet implementing means, responsive to means for identifying, for accessing the cell packet identified by the cell packet address and for writing the data value into the cell sector identified by the cell sector address. The state update means accepts information identified by the cell packet for generating a new state word to be stored in the identified cell packet indicating the state of the cell packet to be processed by the local processor and a state signal for informing the local processor of the state of the identified cell for processing. The processor packet implementing means, responsive to the means for identifying, reads the data base stored in the sector identified by the cell packet address in the cell sector address and provides the data value to the local processor.

DISCLOSURE OF PREFERRED EMBODIMENT

Other objects, features and advantages will occur from the following description of a preferred embodiment and the accompanying, drawings, in which:

FIG. 5 is a schematic block diagram illustrating packet cells of the memory module of FIG. 1 that are used for solving a sample rule;

FIGS. 9 and 10 are flow diagrams illustrating the operation of the processor controller shown in FIG. 3.

This invention may be accomplished by a memory module which controls access of a processor to information stored within the memory module. The memory module stores a plurality of groups of information, each of which includes a data word, an operation word for indicating the operation to be performed by the processor on the data word, and a state word. The state word represents the status of that group of information relating to its readiness to be processed by the processor. The module accepts an access request from the processor which identifies a group and interprets the controls of the request. Based on the interpretation of the contents and the information within the identified group, the status of the group is updated and the processor is selectively signaled for processing that group.

The groups of information of the memory module form an array of stored records, hereinafter referred to as cell packets. Each cell packet is organized into sectors and includes: at least one data sector for storing information to be processed, at least one vector sector for storing a vector word which links the cell packet to other cell packets, and a function sector which includes an operation field for storing an operation word which controls various operations on the data and a state field for storing a state word which indicates whether that cell has been queued and/or requested by the processor. The function sector may also include a data type word for informing the processor that the data is known, or unknown, or whether a test performed on the data should pass or fail.

A packet selection module of the memory module accepts a memory access packet from the processor, interprets the content of the memory access packet, and generates control signals based on the interpreted content. The memory access packet includes a cell packet address and a cell sector address, and may include information to be written into that addressed cell sector. The memory module, as selectively enabled by the control signals, writes data from the memory access packet into the sector of the cell packet identified by the sector address. Alternatively, the function word from the function sector of the cell packet memory is read out to a state modification module which generates a state value based on the function word and the identified sector. The generated state value is then written into the function sector of the identified cell packet to update the function word. The state modification module also produces, based on the generated state value, a status signal which is supplied to the processor indicating that the cell packet is ready for processing. Further, the memory module, as controlled by control signals from the packet selection module, reads out selected information identified by packet address and sector address to the processor to supply the processor with requested information.

Figure 1:
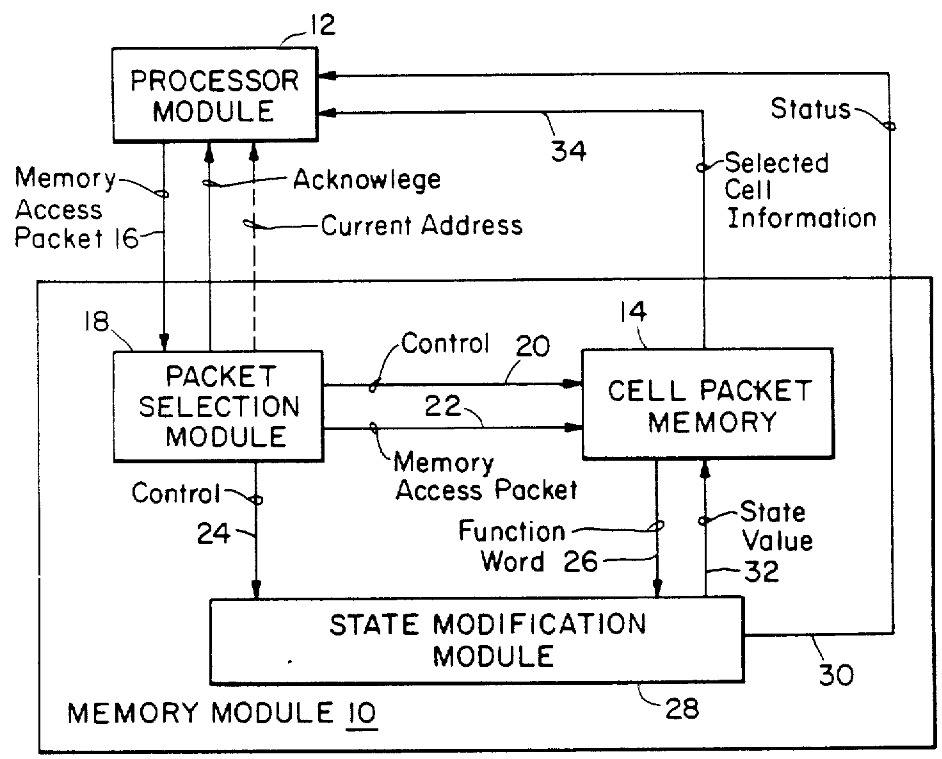
FIG. 1 is a schematic block diagram of a memory module according to this invention and a processor module.

Memory module 10 according to this invention, FIG. 1, controls access by processor module 12 to information stored within cell packet memory 14. Processor module 12 submits memory access packets on line 16 to packet selection module 18 which interprets the content of the memory access packet and generates control signals based on the interpreted content. When commanded by a control signal on line 20, information from the memory access packet is supplied on line 22 and written into the identified sector of a cell packet within cell packet memory 14. When enabled by a control signal, on line 24, the function word and cell sector address are provided on line 26 to state modification module 28. State modification module 28 generates a state value based on the function word and the sector identified in the memory access packet. The state value is written into the state field of the addressed sector, on line 32, to update the status of that cell packet. Based on the generated state value, a status signal is produced and supplied on line 30 to the processor module 12 indicating that the addressed cell packet is ready for processing. Whether or not a status signal is generated, a state value is always provided on line 32 to cell packet memory 14 to update the state of the addressed cell packet for processing. When the status signal is enabled, selected cell information is read on line 34 to processor module 12 for processing; the cell information is identified by the cell address and sector address of the memory access packet.

In this construction, the memory access packet contains a single sector address such that only a single sector of the addressed cell packet is operated on at a time. Alternatively, the entire contents of an addressed cell packet may be addressed by the memory access packet and transferred on line 34 to processor module 12.

The cell packets stored in cell packet memory include at least one data sector, at least one vector sector and a function sector as shown in Table I below. Preferably the data sector includes an X data sector and a Y data sector for storing data words. Vectors words stored in the vector sector of the cell packets define relationships among different cell packets. Four vector sectors labled A–D are shown. The cell packets may be considered as nodes and the vectors as connections or links among the nodes to establish a knowledge network. In other words, the vectors express the relation among the cell packets for a set of preselected rules. The function sector includes an operation field and a state field, and may include a data type field. The operation field is used for storing an operation word which indicates the operation to be performed by the processor on the data word. The state field is used for storing a state word used for indicating the condition of that cell for processing. The data type field is used for storing a word that informs the processor as to how the information in the data sector is to be interpreted. Cell packets are discussed in greater detail below.

TABLE I

| X DATA | Y DATA |
|---|---|
| FUNCTION | |
| AVEC | BVEC |
| CVEC | DVEC |

There are two different types of packets for accessing information in the memory module: Vector packets and processor packets. Vector packets are used for writing a sector or setting the state of a selected cell packet. Processor packets are used in reading a sector or clearing the state of a selected cell packet.

A memory module must, for its operation, be able to determine the characteristics of data within each cell so that memory can control information requests by the processor. The relationships among the cell packets must also be established to enable control by the memory module. Relationships are estabished by the vectors of the cell packets; the vectors in combination with the data and function words implement a set of preselected rules which define a solution to a problem.

Figure 2:
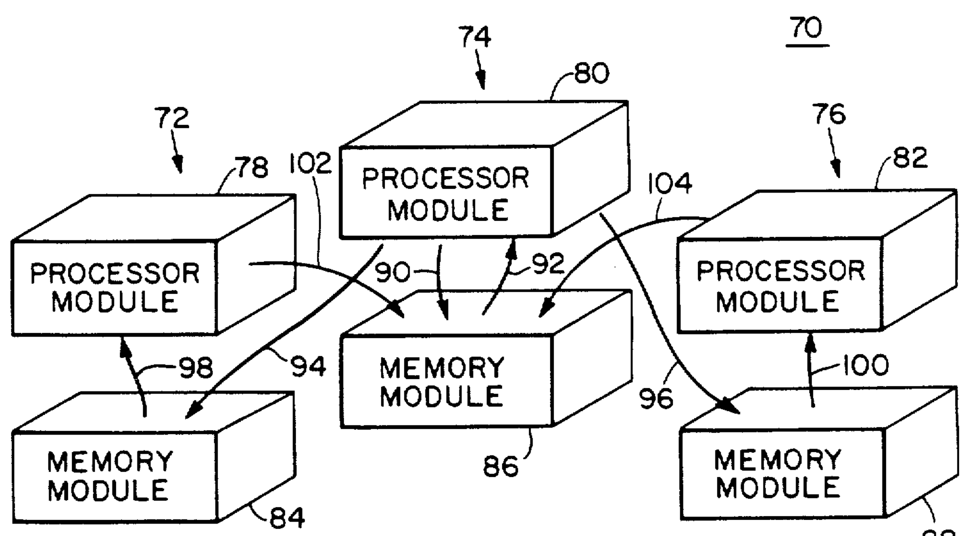
FIG. 2 is a schematic block diagram of processor and memory module pairs illustrating the method for transferring data between the pairs.

Memory modules and processor modules according to this invention readily lend themselves to an integrated memory managed computer system in which a number of pairs of memory modules and processor modules operate independently and yet rapidly for exchanging information. For example, memory managed computer system 70, FIG. 2 includes three pairs 72, 74 and 76 of processor modules 78, 80 and 82, and memory modules 84, 86, and 88 according to this invention. Each memory module 84, 86, 88 contains memory which is configured to include a number of cell packets. The information which is stored in each cell packet may be read only by the processor module of its pair, hereinafter referred to as the local processor, as controlled by the memory module. Adjacent processors, however, may write information into cell packets of adjacent memories as well as cell packets of its local memory.

As an example, information that may be required to solve a problem may be distributed among the memory modules. Processor module 80 requesting information to solve a problem provides a memory access packet on line 90 to its local memory module 86. Memory module 86 analyzes the addressed cell packet and determines that additional information is required to answer the request. Accordingly, memory module 86 supplies selected cell information to local processor module 80 for processing. The selected cell information includes linking information which indicates where among additional cell packets, distributed among adjacent memory modules, the incomplete information can be derived. Based on the linking information processor module 80 makes requests through lines 94 and 96 to adjacent memory modules 84, 88 respectively. These requests are operated on by those memory modules and information is transferred on lines 98, 100 to their local processor modules 78, 82, respectively. Information is then transferred on lines 102, 104 to memory module 86, to which the original request was made, for completing the information for processing. The completed information is then submitted on line 92 to processor module 80, thus completing the original request.

Memory modules 84 and 88 may similarly request information, by lines not shown, from other memory modules through their local processors. Information may also be requested from other cell packets from the same memory module. The advantage of processing information in this manner is that each processor is not burdened with locating information in memory. Instead, data is organized and managed by the memory units. Since the memory modules operate independently of the processor modules, the problems associated with coordinating multiple processors during parallel processing are eliminated.

Figure 3A:
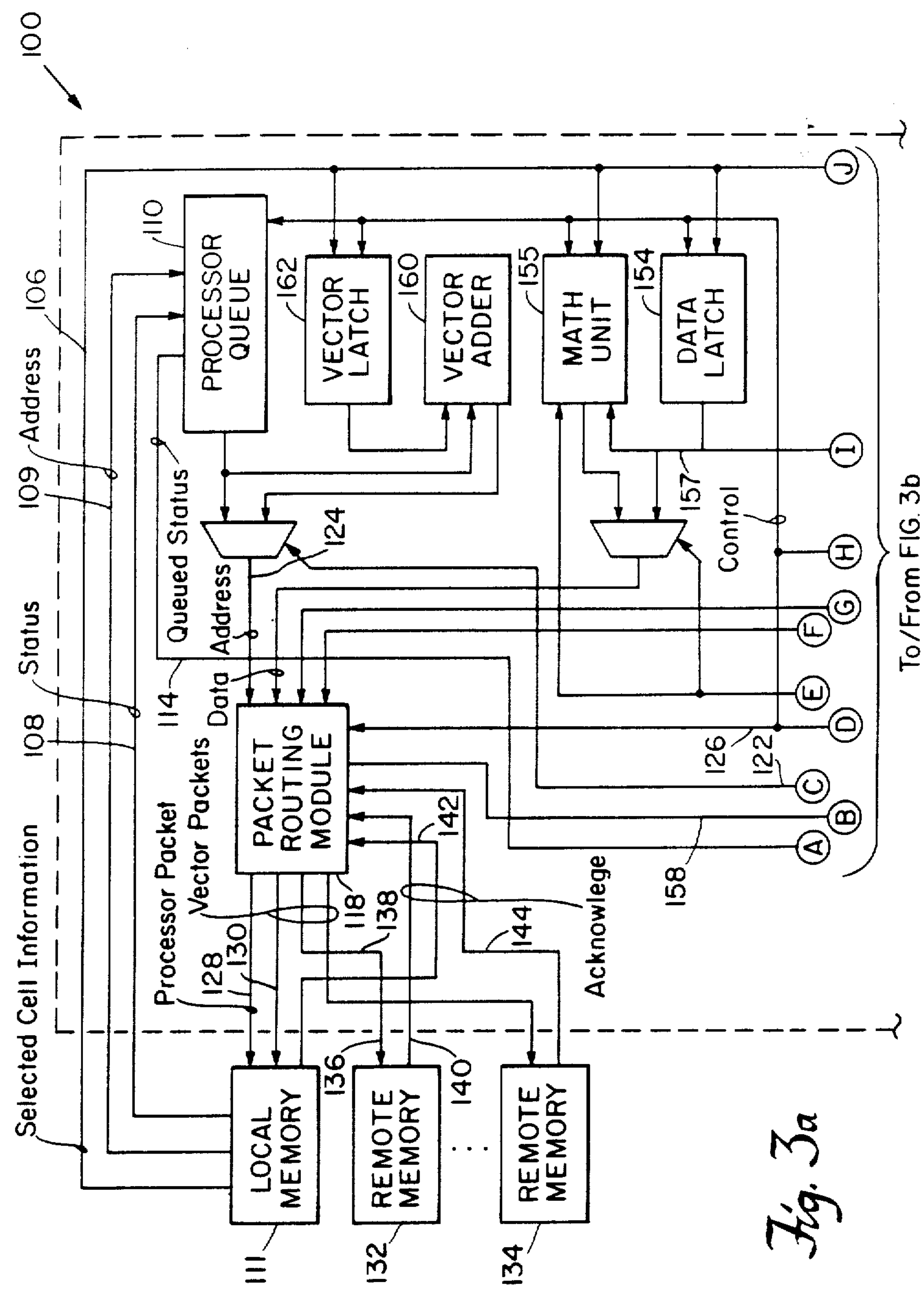
FIG. 3 is a schematic block diagram of the processor module of FIG. 1.
Figure 3B:
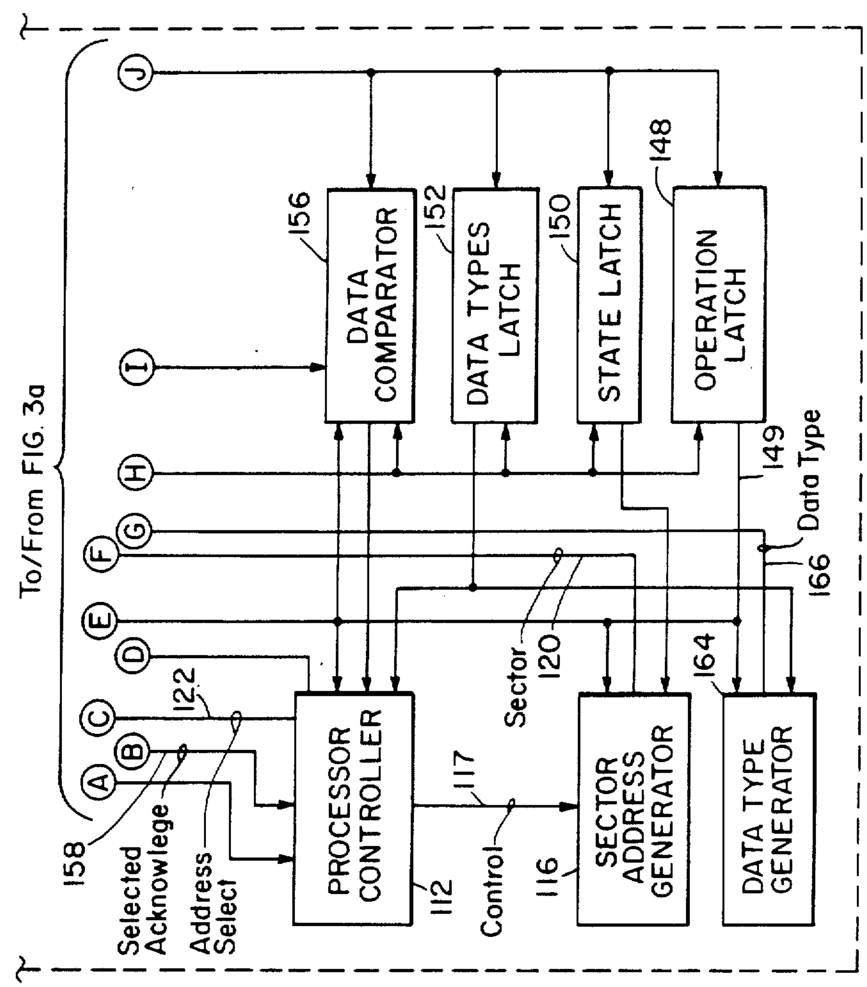

A detailed block diagram of novel processor module 100 is shown in FIG. 3. Processor module 100 is initiated to process information when a status signal over line 108 and a cell address signal over line 109 are provided to it from its local memory 111. This information is provided to a processor queue 110 which then signals a processor controller 112 via queued status line 114 that the processor queue has now received information that a cell packet is ready to be processed. Processor controller 112 then commands a sector address generator 116 via line 117 to write a sector address to a packet routing module 118 via line 120, and then gates via line 122 the queued cell address from processor queue 110 to packet routing module 118 via line 124. Processor controller 112 then signals packet routing module 118 over line 126 to prepare a memory access packet. Depending on the operation to be performed, the memory access packet may consist of a processor packet, which includes a cell packet address and a sector address for essentially performing a read operation. Processor packets are provided only to local memory 111 over line 128. Memory access packet may also consist of a vector packet, which includes a cell packet address, a sector address, data, and data-type for performing the equivalent of a write operation and may be directed to the local memory over line 130 or to adjacent memories 132, 134 over lines 136, 138, respectively. Receipt of the memory access packet by either the local memory or adjacent memories is acknowledged over lines 140, 142 and 144, respectively.

When a processor packet, which serves as a request for the queued cell packet, is received by local memory 111 and has been acknowledged, selected cell information is transmitted over line 146 to the processor module. That information includes the operation or function of the cell packet, which is latched into operation latch 148, and the state of the cell packet, which is latched into state latch 150. In this construction data type is also latched in data type latch 152. Upon the disabling of the acknowledge signal, on line 142, a selected acknowledged signal is sent from packet routing module 118, on line 158, to process controller 112 for signaling sector address generator 116 over line 117 to write a new sector address to packet routing module 118 over line 120. The new sector address is used for preparing a second memory access packet which uses the same gated cell address and the new sector address. This processor packet is then again provided to local memory on line 128. Data type, data, and operation are not latched on the disappearance of this second acknowledgment signal. The second processor packet is sent to change the state of the selected cell packet.

The next operation of the processor module depends entirely on the information that was latched in data type latch 152, state latch 150, and operation latch 148. If the operation requires information from the data sector, then a processor packet is assembled by packet routing module 118 and includes the sector address for that information. That packet is then sent to the local memory. Information addressed by the processor packet is transmitted over line 146 and latched in data latch 154 and data comparator 156. Data latched in data latch 145 is copied in math unit 155 and data comparator 156 via line. 157. Once acknowledgement has been received from the local memory over line 140, packet routing module 118 signals process controller 112, over line 158, for enabling operation latch 148 to select data by gating information from data latch 154 or the result of a mathematical operation performed by a math unit 155, or the results of data comparator 156. Math unit 155 performs a number of mathematical operations. For example it may add data from two different sectors of the same cell packet. Data comparator 156 compares data with a fixed value or with data values in different data sectors.

If the operation requires a link to be performed, that is, if information stored in another cell packet must be accessed or the data result must be written into another cell packet, then the operation latch 148 signals sector address generator 116, on line 149, to place the address of the appropriate vector sector on line 120 to packet routing module 118 for assembling another memory access packet. When that packet is transmitted, on line 128, to local memory 111, information at that vector sector is latched by vector latch 162. Upon acknowledgement by local memory 111, the next operation for process controller 112 is to command processor packet routing module 118 to assemble a vector packet. The cell address of the vector packet is controlled by processor controller 112 by gating the result of vector adder 160 via line 122. The new cell address is determined by adding the information latched in vector latch 162 and the address of the current cell addressed in processor queue 110. Process controller 112 also controls gating of information from math unit 155 or data latch 154 to packet routing module 118 by signaling operation latch 148 via line 126 to generate a gating signal on line 149. A data type is generated by a data type generator 164 and is sent to packet routing module 118 over line 166. The state of the data type is controlled by the information latched in operation latch 148 and data type latch 152. The assembled vector packet is then routed to the appropriate local or adjacent memory via lines 130, 136, or 138 and acknowledged by that memory via lines 140, 142, or 144. Once acknowledgment has been received by packet routing module 118, a signal is sent to processor controller 112 for gating the next cell address in processor queue 110 to be operated on.

Figure 4:
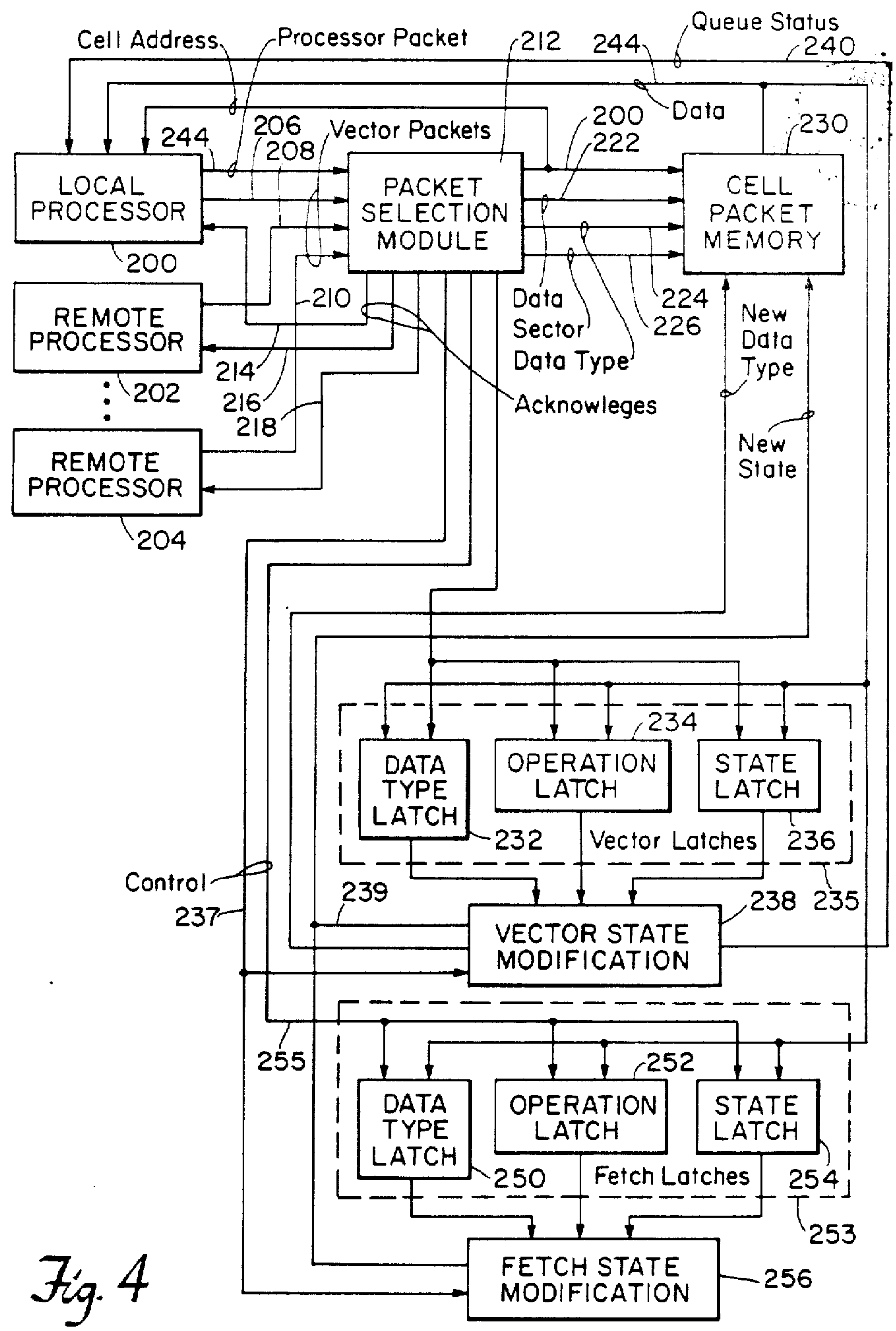
FIG. 4 is a schematic block diagram of the memory module of FIG. 1.

A vector packet may be sent from one of several processors 200, 202 and 204 over lines 206, 208 and 210 respectively to a single memory module as shown in FIG. 4. A packet selection module 212 is used for selecting a vector packet from one of the processors. Acknowlegement from selection module 212 is sent to the selected processor via lines 214, 216 or 218. The cell address, sector address, data type and data value of the vector packet is transmitted by packet selection module 212 to cell packet memory 230 over lines 220, 222, 224 and 226 respectively. Data and data type are then written into the selected cell and sector addressed by the vector packet. Thereafter, packet selection module 212 controls vector latches 235 for latching data type, operation, and state of the vector packet into data type latch 232, operation latch 234 and state latch 236, respectively, via line 244. Packet selection module 212 then controls vector state modification logic module 238 via line 237 to generate a new state based on the information latched by latches 232, 234 and 236. The new vector state is then written into the cell packet memory of the previously selected cell address via line 239. That write operation concludes the vector packet operation, and packet selection module 212 removes the acknowledgment to the selected processor. If the vector state modification logic module 238 causes a transition from a non-queued state to a queued state, a queue status signal is generated on line 240 to the local processor 200, causing it to latch the current cell packet address on line 220 which causes that cell address to be queued in processor queue 110, FIG. 3.

If packet selection module 212 selects a processor packet sent from a local processor over line 244, the cell packet address and the sector address of the processor packet are transmitted to cell packet memory 230 from packet selection module 212 over lines 220 and 226. The information contained in that address is transmitted to local processor 200 over line 244 when packet selection module 212 removes its acknowledge signal. If the processor packet addresses the function sector, then packet selection module 212 controls fetch latches 253 via line 255 to latch the previously read data type, operation, and state into data type latch 250, operation latch 252, and state latch 254, respectively. If the processor packet addresses the state sector, then the fetch state modification logic 256 is controlled by packet selection module 212 via line 237 to generate a new state which is then written into the function section of the currently addressed cell packet. Once the new state has been written into the addressed cell packet the processor packet operation is complete.

The operation of the present invention is further illustrated by a sample rule structure shown in FIG. 5. The problem to be solved is to determine whether cargo can be loaded onto a truck. Before that inquiry can be answered, the amount of available space on the truck must be determined. The process for determining the amount of available space for the cargo is accomplished by comparing the cargo size with the available truck space. Upon determining that the available space is greater than the cargo size, the truck is loaded and the status of the cargo is designated as loaded on the truck. The available truck space is updated by subtracting the cargo size from the available truck space.

Initially the contents of the cell packets are defined by the rules used in the problem. That is, the data and function words in each cell packet and the relationships among the cell packets expressed by vector words are provided to implement selected rules.

Before solving the problem, the cell packets are initialized by removing all of the request and queue flags located in the state sectors of the cell packets. In this example, nine cell packets labeled 0 thru 8 are shown in FIG. 5. For convenience, a legend designating the sectors of the cell packet which is equivalent to Table I is also included. Functions such as requests and triggers made by a host computer are access packets not shown as a part of the cell packet. The request function made by the host processor simply requests information from the cell packet. No data is sent by the processor to the memory cell packet. A trigger function is used to request processing information from the cell packet. In other words, request and trigger packets are both used to update the state of the cell packet. The request packet is used for setting the state of the cell packet to "requested and queued". The trigger packet only sets the packet to a "queued" state.

For the present example, the host computer operates as a remote processor and a remote memory. An initial request is made by the processor for requesting the cargo status. In other words, a memory access packet is generated to request the cell packet having an address of "2" for obtaining cargo status information located in the X data sector. This request consists of a vector packet which only includes the addresses of a cell packet and request "sector", which is part of the state field and is a single bit in this construction that is recognized by the memory module for indicating that a request instruction has been made by the processor module.

As shown in FIG. 5, the X data is presently unknown and is so indicated by a question mark. The currently addressed cell packet also includes a operation "VAR" in the function sector and a "+1" in the C vector sector. The operation "VAR" represents a single value variable operation as illustrated in Table II below. Other operations that will be discussed below are also listed in that Table. The "+1" in C vector sector is used to link the processor to the next cell to be processed and is discussed below.

TABLE II

| INSTRUCTION DESCRIPTION TABLE | |
|---|---|
| OPERATION | DESCRIPTION |
| VAR | SINGLE VALUE VARIABLE |
| SET | SETS THE VALUE OF A VARIABLE (EXCEPT MVAR) |
| DAT | SENDS X DATA |
| REQ | SENDS REQUEST |
| SWP | SENDS Y DATA |
| ADD | ADDS X DATA TO Y DATA |
| SUB | SUBTRACTS Y DATA FROM X DATA |
| MUL | MULTIPLIES X DATA BY Y DATA |
| DIV | DIVIDES X DATA BY Y DATA |
| EQL | TEST FOR X DATA EQUAL TO Y DATA |
| GRT | TEST FOR X DATA GREATER THAN Y DATA |

TABLE II-continued

| INSTRUCTION DESCRIPTION TABLE | |
|---|---|
| OPERATION | DESCRIPTION |
| LST | TEST FOR X DATA LESS THAN Y DATA |
| MSET | SETS A VALUE INTO A MULTI-VALUE VARIABLE |
| MVAR | MULTI-VALUE VARIABLE |
| SFUN | SENDS A SERVICE REQUEST FOR A SYSTEM FUNCTION |
| DFUN | SENDS A SERVICE REQUEST FOR A DISPLAY FUNCTION |
| FVAR | FRAME VARIABLE |
| SVAR | SLOT VARIABLE |
| RVAR | RECORD VARIABLE |
| DVAR | DATABASE VARIABLE |
| MEM | TESTS FOR MEMBERSHIP OF X DATA IN A MULTI-VALUE VARIABLE |
| NMEM | TESTS FOR NO MEMBERSHIP OF X DATA IN A MULTI-VALUE VARIABLE |
| SYN | GENERATES A TRIGGER WHEN IT SENDS X OR Y DATA |
| POW | RAISES X DATA TO THE Y DATA POWER |
| *** | N/A |
| NEQL | TESTS FOR X DATA NOT EQUAL TO Y DATA |
| NGRT | TESTS FOR X DATA NOT GREATER THAN Y DATA |
| NLST | TESTS FOR X DATA NOT LESS THAN Y DATA |
| *** | N/A |
| *** | N/A |
| *** | N/A |
| NOP | NO OPERATION |

Figure 6:
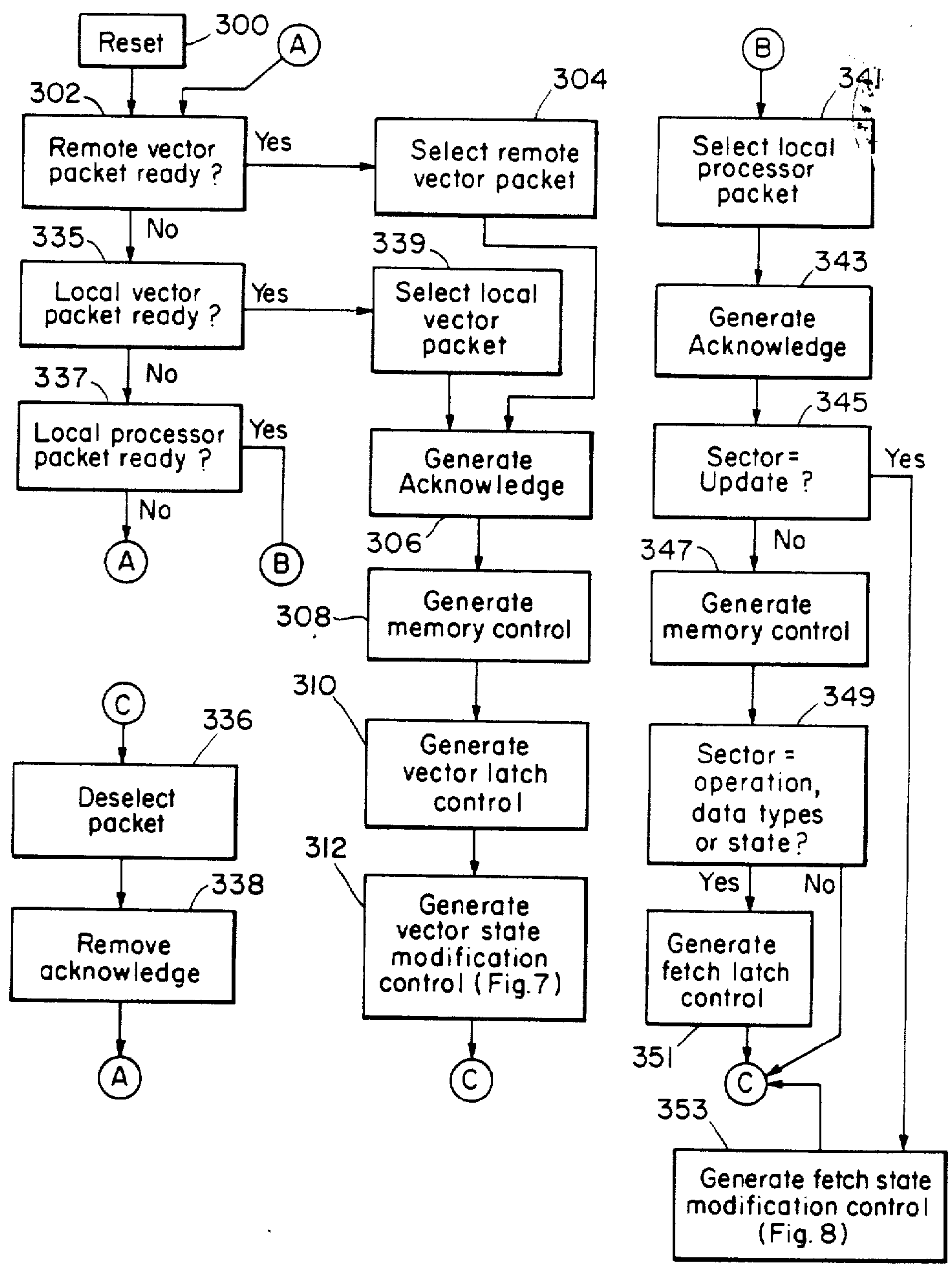
FIG. 6 is a flow diagram illustrating the operation of selecting memory access packets from processors of FIG. 2.

Referring to the memory packet selection flow chart shown in FIG. 6, the cell packets are initially reset, block 300 a test is performed for determining whether a remote packet was selected by packet selection module 212, FIG. 4. Since the computer in this example operates as a remote processor and memory and no other memory access packets have been sent, the remote vector packet is selected, block 304, and an acknowledged signal is generated by packet selection module 212 informing the processor that the remote vector packet has been received, block 306. In the preferred embodiment, remote processors are given priority over its local processor since the local processor typically requires more access to the memory and could therefore lock out adjacent processors. Packet selection module 212 also controls vector latches 232, 234 and 236 to latch data type, operation and state words of the addressed cell packet, block 310. Packet selection 212 module then controls the vector state modification logic 238 to generate a new state and data types. Control is then asserted by memory packet selection module 212 to write a new state and data types into the addressed cell packet, block 312.

Figure 7:
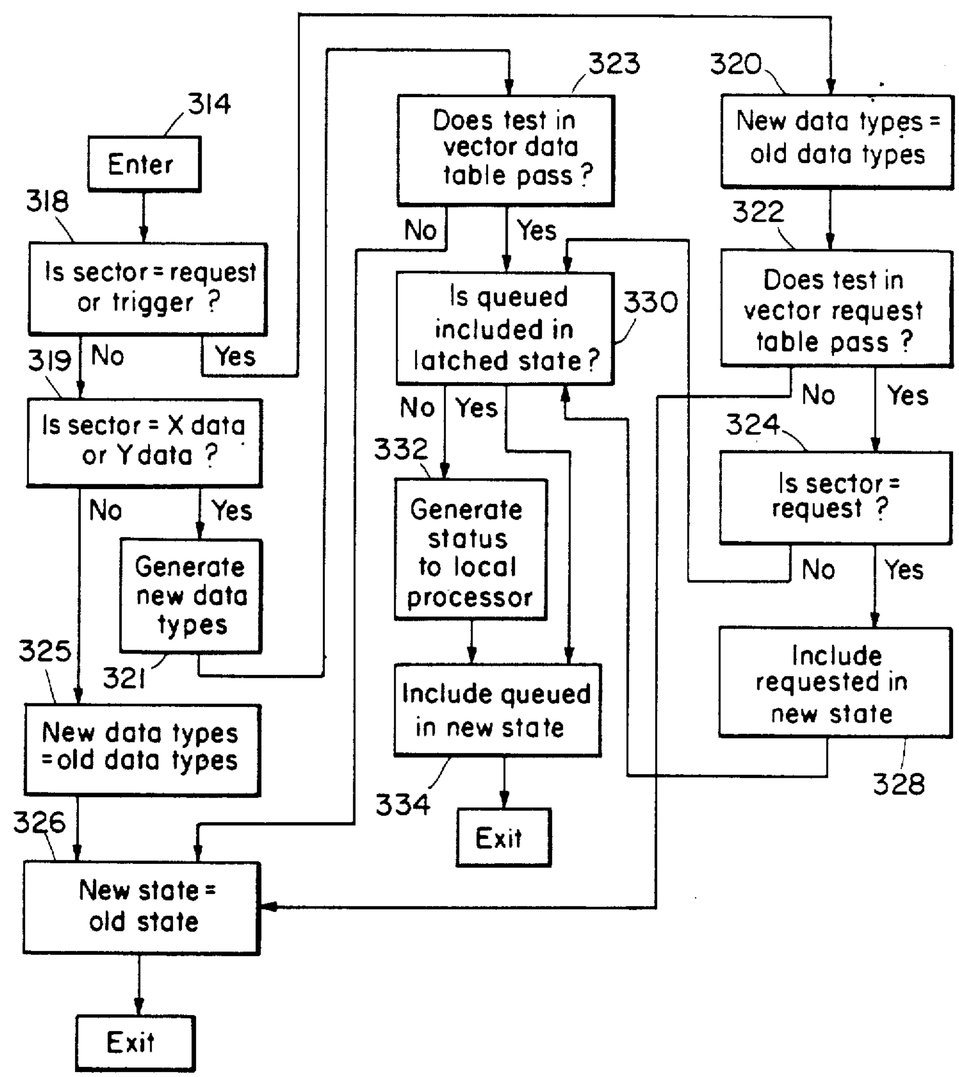
FIG. 7 is a flow diagram illustrating the operation of the memory vector state modification shown in FIG. 4.

A flow chart for vector state modification logic module 238 is illustrated in FIG. 7. Once the data type, operation, and state words are latched, the generate vector state modification control, block 312, determines if the vector packet is addressing a sector, block 318. In essence it is not a request or trigger function. If a sector is addressed then packet selection module 212 controls the cell packet memory 230 to write data into the addressed sector of the cell packet, blocks 319 and 321 and then tests data according to the vector state modification data table, block 323 and Table III below. If no data is to be written into the addressed sector, the new data types are set to equal the old data types and the new state is set to equal the old state, blocks 325, 326. The vector packet is then deselected from the local processor's queue and the acknowledge is removed, blocks 336 and 338, FIG. 6.

Since the vector packet is initially a request in this example, no memory control signals are generated by packet selection module 212 for writing data into a sector, and the new data types will equal the old data types, blocks 318 and 320. The request changes the state of the cell packet to a queued and requested state. Trigger vector packets do not transfer data into a cell packet, rather they initiate operations which update the status of the cell packet for processing. The state is updated by packet selection module 212 which generates memory control signals to read the operation, data types and status of the address cell packet.

TABLE III

| VECTOR STATE MODIFICATION DATA TABLE | |
|---|---|
| OPERATION | TYPE |
| VAR | 2 |
| SET | 3 |
| DAT | 1 |
| REQ | 1 |
| SWP | 1 |
| ADD | 4 |
| SUB | 4 |
| MUL | 4 |
| DIV | 4 |
| EQL | 5 |
| GRT | 5 |
| LST | 5 |
| MSET | 3 |
| MVAR | 2 |
| SFUN | 6 |
| DFUN | 6 |
| FVAR | 2 |
| SVAR | 7 |
| RVAR | 2 |
| DVAR | 2 |
| MEM | 5 |
| NMEM | 5 |
| SYN | 8 |
| POW | 4 |
| *** | 0 |
| NEQL | 5 |
| NGRT | 5 |
| NLST | 5 |
| *** | 0 |
| *** | 0 |
| *** | 0 |

TABLE III-continued

| VECTOR STATE MODIFICATION DATA TABLE | |
|---|---|
| OPERATION | TYPE |
| NOP | 6 |

TYPE DESCRIPTION
0 - INVALID.
1 - ALWAYS PASS.
2 - IF PREVIOUS X DATA TYPE WAS NOT UNKNOWN AND NEW X DATA TYPE IS UNKNOWN, THEN PASS; ELSE FAIL.
3 - IF STATE INCLUDES REQUESTED AND NEW X DATA TYPE IS NOT UNKNOWN, THEN PASS; ELSE FAIL.
4 - IF BOTH NEW X DATA TYPE AND NEW Y DATA TYPE ARE NOT UNKNOWN OR DATA TYPE IS UNKNOWN, THEN PASS; ELSE FAIL.
5 - IF STATE INCLUDES REQUESTED AND NEW X DATA TYPE IS NOT UNKNOWN AND NEW Y DATA TYPE IS NOT UNKNOWN, THEN PASS; ELSE FAIL.
6 - ALWAYS FAIL.
7 - IF NEW Y DATA TYPE IS NOT UNKNOWN, THEN PASS; ELSE FAIL.
8 - IF SECTOR IS X DATA, THEN PASS; ELSE FAIL.

Referring to the vector request table, Table IV below, a test is conducted for determining the new state, block 322. If the test fails then the new state equals the old state, blocks 324 and 326, and the vector state modification logic waits for a ready control signal from packet selection module 212. Since the vector packet selector is a request, the test passes and vector state modification logic 238 includes a "requested" status in the new state, block 328. The state is updated by packet selection module 212 which generates memory control signals to read the operation, data types, and state of the address cell packet. After a new state has been written into the addressed cell packet a determination is made by the vector state modification logic module 238 to see if a queued state is included in the latched state, block 330. Since the queued state was initially cleared, vector state modification logic 238 signals the local processor's queue 110, FIG. 3 that the address is a newly queued cell packet. The status signal on line 143, FIG. 3, is enabled to the local processor which causes the local processor to put the address of this current cell packet into its processor queue 110, block 332, and includes a queued state in the new state written into the addressed cell packet, block 334. Thus the new state written into the current cell packets is "requested and queued."

TABLE IV

| VECTOR STATE REQUEST DATA TABLE | |
|---|---|
| OPERATION | TYPE |
| VAR | 2 |
| SET | 1 |
| DAT | 1 |
| REQ | 1 |
| SWP | 1 |
| ADD | 1 |
| SUB | 1 |
| MUL | 1 |
| DIV | 1 |
| EQL | 1 |
| GRT | 1 |
| LST | 1 |
| MSET | 1 |
| MVAR | 2 |
| SFUN | 1 |
| DFUN | 1 |
| FVAR | 2 |
| SVAR | 2 |
| RVAR | 2 |
| DVAR | 2 |
| MEM | 1 |
| NMEM | 1 |
| SYN | 1 |
| POW | 1 |
| *** | 0 |
| NEQL | 1 |
| NGRT | 1 |

TABLE IV-continued

| VECTOR STATE REQUEST DATA TABLE | |
|---|---|
| OPERATION | TYPE |
| NLST | 1 |
| *** | 0 |
| *** | 0 |
| *** | 0 |
| NOP | 3 |

TYPE DESCRIPTION
0 - INVALID.
1 - IF STATE DOES NOT INCLUDE REQUESTED, THEN PASS; ELSE FAIL.
2 - IF STATE DOES NOT INCLUDE REQUESTED AND X DATA TYPE IS UNKNOWN, THEN PASS; ELSE FAIL.
3 - ALWAYS FAIL.

At this point, the vector packet operation is completed, and cell 2 is both requested and queued. The vector packet is then deselected from the local processor's queue and the acknowledge is removed, blocks 336 and 338, FIG. 6.

If the memory access packet was originated by the local processor rather than a remote processor as in the present example, then the packet selection module 212 determines if the packet is a vector packet or a processor packet, blocks 335 and 337. An acknowledge signal is sent to the local processor when that packet is selected, blocks 339 and 306. This packet is then processed in the same manner as described above. If, however, the packet is a processor packet and is not used to update a sector, the packet selection module controls the cell memory to read the sector of the addressed cell packet, blocks 341, 343, 345, and 347. If the sector addressed is an operation, data type, or state sector, the packet selection module then controls the fetch latches 253, FIG. 4, to latch the operation, data type, and state from the addressed cell packet, blocks 349 and 351.

Figure 8:
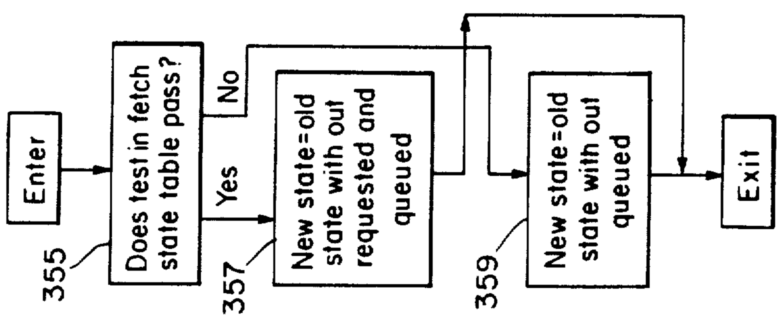
FIG. 8 is a flow diagram illustrating the operation of memory fetch state modification shown in FIG. 4.

When the processor packet sector is used to update a sector, the processor selection module controls the fetch state modification module 256, FIG. 4, to generate a new state and controls the memory to write the new state into the addressed cell packet, block 353, FIG. 6. Fetch state modification module 256 then performs a test according to the fetch state modification table, Table V below. If the test passes, fetch state modification module 256 generates a new state by removing the requested and queued status from the old state, blocks 355 and 357, FIG. 8. Otherwise, fetch state modification module 256 generates a new state by removing the queued status from the old state, block 359.

At this point in the above example the requesting computer has performed the operation identified in the vector packet and in doing so a new cell packet address is placed into the local processor's queue. Now the local processor which has been waiting to be queued, now contains an address and changes its status to not empty, block 340, FIG. 9. This status initializes process controller 112, FIG. 3 to begin a memory access packet production cycle. Process controller 112 selects processor queue 110 as the source of the cell packet address to process, block 342, FIG. 9. Process controller 112 then controls packet routing module 118 to select the operation, data types, and state sector from latches 148, 150 and 152, respectively, for assembling a processor packet, block 344. Once the processor packet has been assembled, packet selection module 118 routes the packet to its local memory unit 111, block 346. This begins a processor packet output cycle. Processor controller 112, FIG. 3 controls the packet routing module 118 to generate and send a processor packet, block 376, FIG. 10.

TABLE V

| FETCH STATE MODIFICATION TABLE | |
|---|---|
| OPERATION | TYPE |
| VAR | 2 |
| SET | 2 |
| DAT | 1 |
| REQ | 1 |
| SWP | 1 |
| ADD | 3 |
| SUB | 3 |
| MUL | 3 |
| DIV | 3 |
| EQL | 3 |
| GRT | 3 |
| LST | 3 |
| MSET | 2 |
| MVAR | 2 |
| SFUN | 2 |
| DFUN | 2 |
| FVAR | 2 |
| SVAR | 2 |
| RVAR | 2 |
| DVAR | 2 |
| MEM | 3 |
| NMEM | 3 |
| SYN | 1 |
| POW | 3 |
| *** | 0 |
| NEQL | 3 |
| NGRT | 3 |
| NLST | 3 |
| *** | 0 |
| *** | 0 |
| *** | 0 |
| NOP | 1 |

TYPE DESCRIPTION
0 - INVALID.
1 - ALWAYS PASS.
2 - IF OLD STATE INCLUDES REQUESTED AND OLD X DATA TYPE IS NOT UNKNOWN. THEN PASS; ELSE FAIL.
3 - IF OLD STATE INCLUDES REQUESTED AND OLD X DATA TYPE IS NOT UNKNOWN AND OLD Y DATA TYPE IS NOT UNKNOWN, THEN PASS; ELSE FAIL.

At this point packet selection module 118 and process controller 112 wait for the selected acknowledge to be asserted and removed by the local memory unit, blocks 378 and 380. This ends the cycle for packet routing module 118. Processor controller 112 now generates the latch control signals, blocks 382, 383, for the data type, operation, state latches, block 348, FIG. 9.

Process controller 112 then performs a test to check the previously latched operation to determine if X data or Y data value is required and known. That determination is made in accordance with Tables VI and VII below. If an X data value is needed then process controller 112 controls sector generator 116 to select the X data sector of cell packet. If it needs Y data process controller 112 generates control signals to sector generator 116 to select the Y data sector of the cell packet, blocks 352, 354, 356, 358, 360. The process controller then performs a processor packet output cycle described above. At the completion of the output cycle processor controller 112 then tests for 5 vectors, E, A, B, C, and D, block 364. If a vector type has been enabled, block 366, process controller 112 performs a test according to a vector link table, Table VIII below, block 368. The process controller then performs a vector packet output cycle, block 370.

TABLE VI

| PROCESSOR DATA TABLE | |
|---|---|
| OPERATION | TYPE |
| VAR | 1 |
| SET | 1 |
| DAT | 1 |
| REQ | 3 |
| SWP | 1 |
| ADD | 2 |
| SUB | 2 |
| MUL | 2 |
| DIV | 2 |
| EQL | 3 |
| GRT | 3 |
| LST | 3 |
| MSET | 1 |
| MVAR | 1 |
| SFUN | 1 |
| DFUN | 1 |
| FVAR | 1 |
| SVAR | 1 |
| RVAR | 1 |
| DVAR | 1 |
| MEM | 3 |
| NMEM | 3 |
| SYN | 1 |
| POW | 2 |
| *** | 0 |
| NEQL | 3 |
| NGRT | 3 |
| NLST | 3 |
| *** | 0 |
| *** | 0 |
| *** | 0 |
| NOP | 3 |

TYPE DESCRIPTION
0 - INVALID.
1 - USES X DATA.
2 - USES X DATA AND Y DATA.
3 - DOES NOT USE DATA.

TABLE VII

| PROCESSOR DATA TYPE TABLE | |
|---|---|
| OPERATION | TYPE |
| VAR | 1 |
| SET | 1 |
| DAT | 1 |
| REQ | 3 |
| SWP | 1 |
| ADD | 2 |
| SUB | 2 |
| MUL | 2 |
| DIV | 2 |
| EQL | 3 |
| GRT | 3 |
| LST | 3 |
| MSET | 1 |
| MVAR | 1 |
| SFUN | 1 |
| DFUN | 1 |
| FVAR | 1 |
| SVAR | 4 |
| RVAR | 1 |
| DVAR | 1 |
| MEM | 3 |
| NMEM | 3 |
| SYN | 1 |
| POW | 2 |
| *** | 0 |
| NEQL | 3 |
| NGRT | 3 |
| NLST | 3 |
| *** | 0 |
| *** | 0 |
| *** | 0 |

TABLE VII-continued

PROCESSOR DATA TYPE TABLE

| OPERATION | TYPE |
|---|---|
| NOP | 3 |

TYPE DESCRIPTION

0 - INVALID.

1 - OUTPUT DATA TYPE IS X DATA TYPE.

2 - IF ANY DATA TYPE IS UNKNOWN, THEN OUTPUT DATA TYPE IS UNKNOWN; ELSE

IF ANY DATA TYPE IS PASS, THEN OUTPUT DATA TYPE IS PASS; ELSE

IF ANY DATA TYPE IS FAIL, THEN OUTPUT DATA TYPE IS FAIL; ELSE OUTPUT DATA TYPE IS VALUE.

3 - OUTPUT DATA TYPE IS UNKNOWN.

4 - IF Y DATA TYPE IS UNKNOWN, THEN OUTPUT DATA TYPE IS UNKNOWN; ELSE OUTPUT DATA TYPE IS X DATA TYPE.

VECTOR LINK TABLE

| OPERATION | TYPE A | TYPE B | TYPE C | TYPE D | TYPE E |
|---|---|---|---|---|---|
| VAR | 9 | 9 | 5 | 5 | 12 |
| SET | 22 | 1 | 5 | 1 | 1 |
| DAT | 3 | 3 | 3 | 3 | 1 |
| REQ | 2 | 2 | 2 | 2 | 1 |
| SWP | 4 | 4 | 4 | 4 | 1 |
| ADD | 7 | 8 | 5 | 6 | 1 |
| SUB | 7 | 8 | 5 | 6 | 1 |
| MUL | 7 | 8 | 5 | 6 | 1 |
| DIV | 1 | 1 | 5 | 6 | 21 |
| EQL | 10 | 11 | 5 | 6 | 1 |
| GRT | 10 | 11 | 5 | 6 | 1 |
| LST | 10 | 11 | 5 | 6 | 1 |
| MSET | 1 | 1 | 5 | 1 | 23 |
| MVAR | 9 | 9 | 5 | 5 | 20 |
| SFUN | 22 | 1 | 5 | 1 | 13 |
| DFUN | 22 | 1 | 5 | 1 | 13 |
| FVAR | 3 | 3 | 1 | 1 | 1 |
| SVAR | 14 | 1 | 15 | 6 | 1 |
| RVAR | 9 | 9 | 5 | 1 | 1 |
| DVAR | 16 | 16 | 1 | 1 | 24 |
| MEM | 1 | 1 | 5 | 6 | 21 |
| NMEM | 1 | 1 | 5 | 6 | 21 |
| SYN | 17 | 18 | 19 | 18 | 1 |
| POW | 1 | 1 | 5 | 6 | 21 |
| *** | 0 | 0 | 0 | 0 | 0 |
| NEQL | 11 | 10 | 5 | 6 | 1 |
| NGRT | 11 | 10 | 5 | 6 | 1 |
| NLST | 11 | 10 | 5 | 6 | 1 |
| *** | 0 | 0 | 0 | 0 | 0 |
| *** | 0 | 0 | 0 | 0 | 0 |
| *** | 0 | 0 | 0 | 0 | 0 |

-continued

VECTOR LINK TABLE

| OPERATION | TYPE A | TYPE B | TYPE C | TYPE D | TYPE E |
|---|---|---|---|---|---|
| NOP | 1 | 1 | 1 | 1 | 1 |

VECTOR LINK TYPE DESCRIPTION

0 - INVALID.

1 - ALWAYS FAIL.

2 - ALWAYS PASS (SECTOR = REQUEST).

3 - ALWAYS PASS (SECTOR = X DATA).

4 - ALWAYS PASS (SECTOR = Y DATA).

5 - IF STATE INCLUDES REQUESTED AND X DATA TYPE IS UNKNOWN, THEN PASS (SECTOR = REQUEST); ELSE FAIL.

6 - IF STATE INCLUDES REQUESTED AND Y DATA TYPE IS UNKNOWN, THEN PASS (SECTOR = REQUEST); ELSE FAIL.

7 - IF STATE DOES NOT INCLUDE REQUESTED OR STATE INCLUDES REQUESTED AND BOTH X DATA TYPE AND Y DATA TYPE ARE NOT UNKNOWN, THEN PASS (SECTOR = X DATA); ELSE FAIL.

8 - IF STATE DOES NOT INCLUDE REQUESTED OR STATE INCLUDES REQUESTED AND BOTH X DATA TYPE AND Y DATA TYPE ARE NOT UNKNOWN, THEN PASS (SECTOR = Y DATA); ELSE FAIL.

9 - IF STATE DOES NOT INCLUDE REQUESTED OR STATE INCLUDES REQUESTED AND X DATA TYPE IS NOT UNKNOWN, THEN PASS; (SECTOR = X DATA) ELSE FAIL.

10 0- IF X DATA TYPE IS NOT UNKNOWN AND Y DATA TYPE IS NOT UNKNOWN AND COMPARATOR RESULT IS TRUE THEN:
IF STATE INCLUDES REQUESTED, THEN PASS (SECTOR = REQUEST); ELSE PASS (SECTOR = TRIGGER); ELSE FAIL.

11 - IF X DATA TYPE IS NOT UNKNOWN AND Y DATA TYPE IS NOT UNKNOWN AND COMPARATOR RESULT IS FALSE THEN:
IF STATE INCLUDES REQUESTED, THEN PASS (SECTOR = REQUEST); ELSE PASS (SECTOR = TRIGGER); ELSE FAIL.

12 - IF STATE INCLUDES REQUESTED AND X DATA TYPE IS UNKNOWN AND VECTOR C IS NOT ENABLED AND VECTOR D IS NOT ENABLED, THEN PASS (SECTOR = SERVICE); ELSE FAIL.

13 - IF STATE INCLUDES REQUESTED AND X DATA TYPE IS NOT UNKNOWN, THEN PASS (SECTOR = SERVICE); ELSE FAIL.

14 - IF BOTH STATE DOES NOT INCLUDE REQUESTED AND Y DATA TYPE IS NOT UNKNOWN OR STATE INCLUDES REQUESTED AND X DATA TYPE IS NOT UNKNOWN AND Y DATA TYPE IS NOT UNKNOWN, THEN PASS (SECTOR = X DATA); ELSE FAIL.

15 - IF STATE INCLUDES REQUESTED AND X DATA TYPE IS UNKNOWN AND Y DATA TYPE IS NOT UNKNOWN, THEN PASS (SECTOR = REQUEST); ELSE FAIL.

16 - IF STATE DOES NOT INCLUDE REQUESTED AND X DATA TYPE IS UNKNOWN, THEN PASS (SECTOR = X DATA); ELSE FAIL.

17 - IF COMPARATOR RESULT IS FALSE, THEN PASS (SECTOR = X DATA); ELSE FAIL.

18 - IF COMPARATOR RESULT IS FALSE, THEN PASS (SECTOR = Y DATA); ELSE FAIL.

19 - IF COMPARATOR RESULT IS FALSE AND X DATA TYPE IS NOT UNKNOWN, THEN PASS (SECTOR = TRIGGER); ELSE FAIL.

20 - IF STATE INCLUDES REQUESTED AND X DATA TYPE IS UNKNOWN, THEN PASS (SECTOR = SERVICE); ELSE FAIL.

21 - IF STATE DOES NOT INCLUDE REQUESTED OR STATE INCLUDES REQUESTED AND X DATA TYPE IS NOT UNKNOWN AND Y DATA TYPE IS NOT UNKNOWN, THEN PASS; (SECTOR = SERVICE) ELSE FAIL.

22 - IF STATE INCLUDES REQUESTED AND X DATA TYPE IS NOT UNKNOWN, THEN PASS; (SECTOR = X DATA) ELSE FAIL.

23 - IF STATE INCLUDES REQUESTED AND X DATA TYPE IS NOT UNKNOWN, THEN PASS; (SECTOR = SERVICE) ELSE FAIL.

24 - IF STATE INCLUDES REQUESTED AND X DATA TYPE IS UNKNOWN, THEN PASS; (SECTOR = SERVICE) ELSE FAIL.

Figure 10:
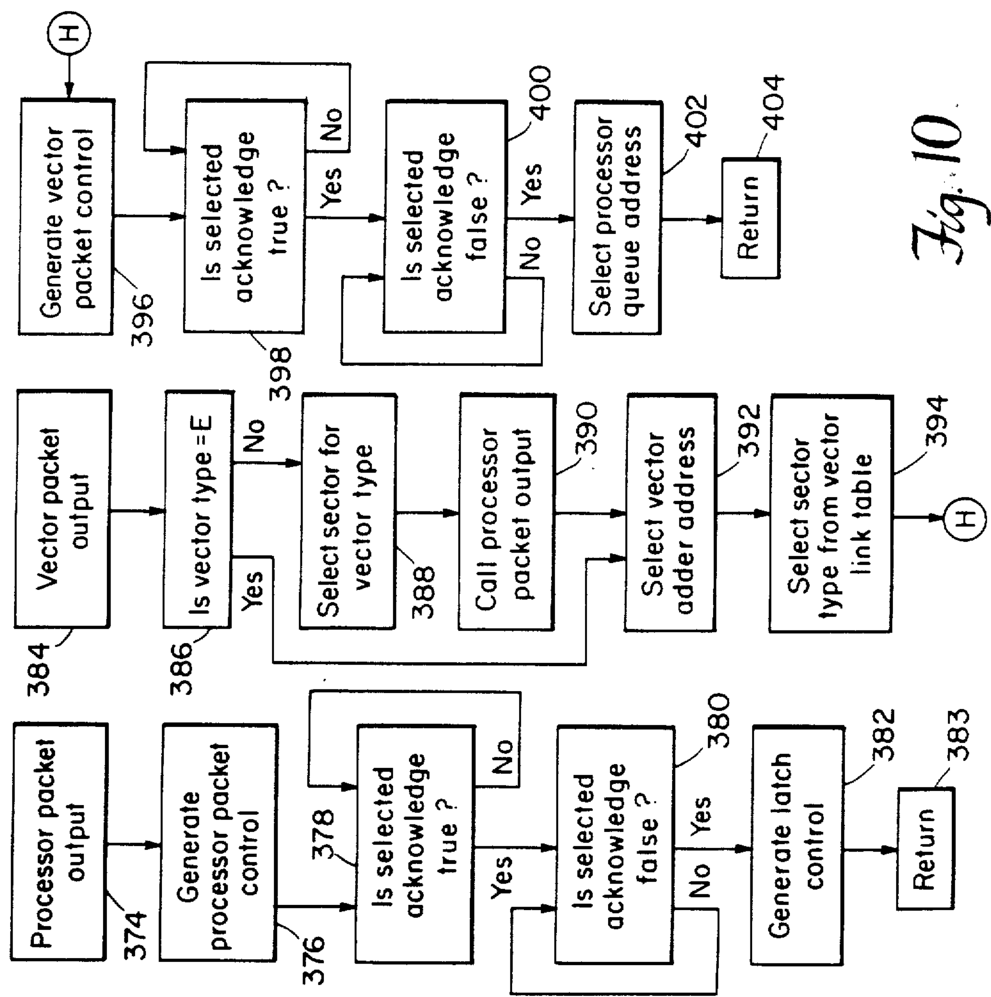

Processor controller 112 tests for the special vector E which is used to request service from the host computer, block 386, FIG. 10. If service is requested from the host computer then processor controller 112 selects processor queue 110 as the source of the cell packet address, block 392. Otherwise, the processor controller first controls sector generator 116 to select the current vector type, and preform a processor packet output cycle to read the current vector sector from the addressed cell packet, blocks 388 and 390, before selecting the vector adder 160 as the source of the cell packet address, block 392. Processor controller 112 then controls sector generator 116 to select the appropriate sector for the current vector type, state, and operation, block 394. Control signals are also sent to packet routing module 118 to generate a vector packet and send it to the appropriate memory module. Once the packet is sent, processor controller waits for an acknowledge to be asserted indicating that the memory module is working on the vector packet, block 398. When the acknowledge signal is removed, the memory module is finished with the packet, block 400. After cycling through the five possible vectors, processor controller 112 then selects the next address in processor queue 110 as the next source for the cell packet address, blocks 402, 404, FIG. 10, blocks 364 and 374, FIG. 9. This ends the vector packet output cycle.

Returning to the example, FIG. 5, since cell packet 2 was requested and the X data value is unknown, C vector is enabled. Referring to the vector link table, Table VIII, the test for the C vector passes. For example, indexing a C vector with a variable function, VAR, indicates that the test passes because the state of this cell packet includes a request and the X data type is unknown. Under a pass condition processor controller 112 calls for a vector packet output cycle. This cycle has two results: it reads the C vector of the cell together with the previous processor packet address "2" and then selects the vector adder 160, FIG. 3, for gating the result as the cell packet address. Thus, the plus 1 stored in the C vector address is added to the cell address of 2 for assembling a vector packet having a cell address of 3, to identify Cell 3. This vector packet is a vector request and is transferred back to local memory 111, on line 130. This vector request will cause the state for Cell 3 to be set to a requested and queued state, and also cause Cell 3 to be queued in the processor's queue 110. In Cell 3, the X data value is unknown so the local processor will perform a vector operation on the C vector sector, since A vector fails the vector link test of Table VII. This operation causes a request to be made for a cell packet addressed at 0, Cell 0, (3−3=0). It will also cause the processor to assemble a request vector for Cell 1 since the Y data is also unknown.

Thus, for the "greater than" operation of Cell 3, a request is made to obtain X and Y data values. The X data represents the available truck space, and the Y data represents the cargo size. For this case, the A vector request is only performed when the X and Y data are known and X data is greater than Y data. In other words, Cell 3 is queued for performing the greater than function only when the X and Y data values are obtained.

Cells 0 and 1 are now handled by the processor since they contain data necessary to perform their operation. The processor handling Cell 0 does an A vector of plus 3 which stores the X value (1000) into the X data sector of Cell 3, and a B vector of plus 6 stores the value 1000 into the X data sector of Cell 6 for a subtract function. The processor handling Cell 1 does an A vector of plus 7 which puts the X data value (521) into the X data sector of Cell 8. When Cell 8 is queued, the X data value is sent to the Y data sector of Cell 3 and to the Y data sector of Cell 6.

Cell 3, is now queued since it now has all of the necessary data needed to form the greater than function. Note that Cell 6 is not queued because it has not been requested. The processor then performs a test of greater than for Cell 3. If this test passes, an A vector is performed which queues up Cell 4. Had this test failed, the B vector would have been performed. However, since there is no B vector, the program would have stopped here because the C and D vectors were already performed. For the present case it is assumed that the test passes, and a request vector of plus 1 is performed. This operation queues Cell 4 which in turn performs a request of Cells 5 and 7. These addresses are placed in processor queue 110. When Cell 5 is processed, the available truck space is set. When Cell 7 is processed, the cargo status is set. The processor handles cell 5 first and does a C vector of plus 1, since the X data value in the X data sector is unknown. This queues up Cell 6. Since Cell 7 was the next thing queued, Cell 7 does an A vector which sends data in the X data sector to the X data sector of Cell 2. Cell 6 is now queued up by the processor. Since the X and Y values are now known, an A vector is performed. Cell 5 is now queued by the processor and performs an A vector of −5, since the result of Cell 6 is placed in the X data sector of that cell. The data in the X data sector is now sent to Cell 0, which updates the available truck space. At this point there is nothing placed in the queue so the processor goes idle, and the X data value is read out of Cell 2, since the cargo status is now known.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A memory module for controlling access by a processor to information stored within the memory module, comprising:

memory means for storing a plurality of groups of information, each group including a data word, an operation word for indicating the operation to be performed by the processor on the data word, and a state word for representing the availability of that group for processing by the processor;

selection means for acknowledging read and write access requests from the processor, indicating the availability of a data word and queuing an available data word for transmission to the processor;

state modification means for determining, based upon the information within the identified group in the memory means and said indication of availability by said selection means, that the data word is ready to be processed by the processor and for updating the state word to indicate the current processing status and signalling the processor that the data word is ready to be processed; and means, enabled by the signal of said state modification means, for reading out to said processor the data word identified in the memory means.

2. The memory module of claim 1 in which said selection means selectively writes a data word to supplement an existing data word.

3. The memory module of claim 1 in which each group further includes at least one vector word for linking that group with each other group identified by the vector word.

4. The memory module of claim 3 in which the access request includes an address for the identified group and the memory module further includes means for combining the vector word with the address of the identified group for linking said processor to each other group identified by said vector word.

5. The memory module of claim 4 includes means for defining a data sector for storing the data word, a function sector for storing the operation word and the state word, and at least one vector sector for storing each vector word.

6. The memory module of claim 5 in which the access request acknowledged by said selection means includes a vector packet including an address for the identified group, and a sector address for each sector in that group, and said vector packet further includes a data word, and a data type word indicating the classification of the data word.

7. The memory module of claim 6 further including means for writing the data from the vector packet into the data sector and the data type into the state word of the function sector.

8. The memory module of claim 5 in which the said access request accepted by said selection means is a processor packet having an address for the identified group and a sector address within that group.

9. A memory module for controlling access by a processor to information stored within the memory module, comprising:

selection means, responsive to read and write memory access packets, for generating control signals;

cell packet memory for storing a plurality of cell packets in associated cell packet records, each cell packet record including at least one data sector for storing data, at least one vector sector for linking together other cell packet records to be processed, and a function sector which includes an operational word for identifying a predetermined function to be performed by the processor and a state word for indicating the state of the cell packet for processing by the processor;

means, enabled by a control signal of the selection means, for writing data from the memory access packet into a sector of the cell packet identified by the sector address;

state modification means for updating the state of the cell packet for processing;

means, enabled by a control signal of the selection means, for reading out information in the identified sector by the memory access packet to the state modification means;

said state modification means generating a state value based on the information in the identified sector, and producing, based on the generated state value, a status signal to the processor indicating that the cell packet is ready for processing;

means for writing the generated state value into the function sector of the identified cell packet to update the function sector; and means, enabled by said control signal of said state modification means responsive to said state value, for reading out to said processor available information identified by said cell packet address and sector address.

10. The memory module of claim 9 in which:

said memory access packet is a vector packet including a cell packet address, a cell sector address, and data type; and said means for writing further includes means for writing the data type from the vector packet into the sector of the cell packet identified by the sector address.

11. The memory module of claim 9 in which said read memory access packet is a processor packet which includes a cell packet address and a cell sector address of a sector within the cell packet.

12. The memory module of claim 9 in which said memory module controls access by a plurality of processors and said selection means accepts memory access packets from all of said processors.

13. The memory module of claim 9 further including means for supplying the processor with the vector word identified by said sector address and the address of the identified cell packet for transmitting to the processor the next cell packet address to be processed.

14. A memory module for a memory-managed computer system for successively processing a plurality of vector packets and processor packets supplied from at least a local processor; each vector packet including a cell packet address, a cell sector address, and data type; each processor packet including a cell packet address and a cell sector address; the memory module, comprising;

connection means for supplying a vector packet or a processor packet from the local processor;

means, responsive to said connection means, for acknowledging the type of packet and its receipt by the local processor;

memory means configured in a plurality of cell packet records, each cell packet record arranged in a plurality of sectors including a function sector which includes an operation field for storing an operation word for enabling the processor to perform a preselected function, a state sector for storing an operation word for enabling the processor to perform a preselected function, a state sector for storing a state word to indicate the state of the cell packet for processing by the processor, at least one vector sector for storing a vector word used to link together other cell packets to be processed by the processor, and at least one data sector for storing data words;

vector packet implementing means, responsive to said means for identifying, for accessing the cell packet identified by the cell packet address for writing the data value into the cell sector identified by the cell sector address;

state update means for accepting the information identified by said packets for generating a new state word indicating the current activity involving the information to be stored in the identified cell packet indicating the state of the cell packet to be processed by the local processor and a status signal for informing the local processor of the state of the identified cell for processing;

processor packet implementing means, responsive to said means for identifying, for reading the data value stored in the sector identified by the cell packet address and the cell sector address; and means, enabled by said state update means' status signal to the local processor responsive to said new state word indicating the state of the cell pocket to be processed, for reading out to said local processor available information identified by said cell packet address and sector address.

* * * * *